(12) United States Patent
Takagi et al.

(10) Patent No.: US 7,182,553 B2
(45) Date of Patent: Feb. 27, 2007

(54) METHOD FOR DELIVERING FINE PARTICLE DISPERSION, AND DEVICE FOR DELIVERING FINE PARTICLE DISPERSION

(75) Inventors: Seiichi Takagi, Minamiashigara (JP); Kazuki Inami, Ashigarakami-gun (JP); Tetsuo Ohta, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 68 days.

(21) Appl. No.: 11/067,642

(22) Filed: Feb. 28, 2005

(65) Prior Publication Data
US 2006/0016498 A1   Jan. 26, 2006

(30) Foreign Application Priority Data
Jul. 21, 2004   (JP) .............................. 2004-213421

(51) Int. Cl.
*B65G 53/16*   (2006.01)
(52) U.S. Cl. .................. 406/86; 406/191; 406/197
(58) Field of Classification Search .................. 406/86, 406/191, 197
See application file for complete search history.

(56) References Cited

U.S. PATENT DOCUMENTS

| | | | | |
|---|---|---|---|---|
| 4,982,097 | A * | 1/1991 | Slivon et al. ................ 250/288 |
| 5,637,469 | A * | 6/1997 | Wilding et al. .............. 435/7.21 |
| 5,716,852 | A * | 2/1998 | Yager et al. ................. 436/172 |
| 6,177,479 | B1 * | 1/2001 | Nakajima et al. .............. 516/73 |
| 6,296,810 | B1 * | 10/2001 | Ulmer ..................... 422/82.07 |
| 6,596,140 | B2 * | 7/2003 | Nordman et al. ........... 204/452 |
| 6,710,874 | B2 * | 3/2004 | Mavliev ..................... 356/336 |
| 6,802,640 | B2 * | 10/2004 | Schubert et al. ......... 366/181.6 |
| 6,835,313 | B2 * | 12/2004 | Sando et al. ................ 210/634 |

FOREIGN PATENT DOCUMENTS

| | | |
|---|---|---|
| JP | 2002-361002 | 12/2002 |
| JP | 2003-500202 | 1/2003 |
| JP | 2003-193119 | 7/2003 |
| WO | WO 00/72955 | 12/2000 |

OTHER PUBLICATIONS

Kagaku Kogaku; "Chemical Engineering of Japan"; vol. 66; No. 2; Feb. 5, 2002 with translation.

* cited by examiner

*Primary Examiner*—Joe Dillon, Jr.
(74) *Attorney, Agent, or Firm*—Oliff & Berridge, PLC

(57) ABSTRACT

Disclosed is a method of delivering a fine particle dispersion in the state of laminar flow from an inlet port to an outlet port of a microflow channel having the inlet port and the outlet port, the fine particle dispersion containing fine particles having a volume average particle size of from about 1.5 μm to about 1000 μm dispersed in its liquid medium, the specific gravity of the fine particles being from approximately 0.10 to 0.99 times that of the liquid medium, wherein the microflow channel is disposed such that the outlet port is disposed above the inlet port in the buoyant force direction, and the angle of the flow channel from the inlet port to the outlet port is set to from approximately 0 to 45° relative to the buoyant force direction, and wherein the fine particle dispersion is introduced into the inlet port and the introduced fine particle dispersion is delivered to the outlet port. Also disclosed is a device for delivering the fine particle dispersion.

20 Claims, 2 Drawing Sheets

METHOD FOR DELIVERING FINE PARTICLE DISPERSION, AND DEVICE FOR DELIVERING FINE PARTICLE DISPERSION

CROSS-REFERENCE TO RELATED APPLICATION

This application claims priority under 35 USC 119 from Japanese Patent Application No. 2004-213421, the disclosure of which is incorporated by reference herein.

BACKGROUND OF THE INVENTION

1. Field of the Invention

The present invention relates to a method for delivering a fine particle dispersion and a device for delivering a fine particle dispersion by use of a microflow-channel.

2. Description of the Related Art

In recent years, various research has been made into performing chemical reactions, unit operations or the like at a scale in the order of micrometers. In connection with this, methods and devices have been suggested for extraction, separation, mixing or particle formation, focussing on the short diffusion times.

Dispersions of fine particles having a specific gravity smaller than that of the liquid medium thereof and having a size in the order of microns are usually caused to flow in channels (or pipes) having a cross-sectional area in the order of centimeters or more.

However, there has not been suggested any method for causing a dispersion of fine particles having a specific gravity smaller than the liquid medium thereof and having a size in the order of microns to flow efficiently in channels having an inner cross-sectional area in the order of micrometers.

This is based on the following reason: when a dispersion of fine particles having a specific gravity smaller than the liquid medium thereof and having a size in the order of microns is caused to flow in channels having an inner cross-sectional area in the order of micrometers, problems of stagnation or clogging of flow arise since the specific gravity of the fine particles is smaller than that of the medium, and the fine particles float. In particular, it has been known that a fluid in a channel having an inner cross-sectional area in the order of micrometers flows in the state of laminar flow due to the inner cross-sectional area being small. However, with laminar flow, there is no stirring inside the fluid, and accordingly, fine particles which float while the fluid flows gradually gather together and are thus deposited on the upper surface of the inside of the channel. When this process further proceeds, the channel may become clogged up. When the microflow-channel becomes blocked up, it is very difficult to free the clogging, resulting in a more serious problem.

Hitherto, it has been considered that the effect of buoyant forces on fine particles in a channel having an inner cross-sectional area in the order of micrometers becomes relatively small (see, for example, "Kagaku Kogaku (Chemical Engineering)" vol. 66 No. 2 (2002)). However, it has been found that floatation of dispersed fine particles in the order of microns due to buoyant forces becomes problematic. This is because the situation of the channel relative to the buoyant force direction is not ordinarily considered.

On the other hand, when a dispersion of fine particles in the order of microns is caused to flow in a channel having a cross-sectional area in the order of centimeters, fine particles rarely float and deposit on the upper surface within the channel. It can be considered that although the floatation of the fine particles could physically occur, the fluid in the channel flows in a turbulent flow state, so that the fluid is agitated and the fine particles are not floated, and the deposition of the fine particles on the upper surface within the channel does not take place.

As methods for performing chemical reactions, unit operations or the like at a micrometer-scale as mentioned above, for example, a solvent-extracting method using a micro-fluid-system is suggested (see, for example, Japanese Patent Application Laid-Open (JP-A) No. 2002-361002). However, this is not a method for use in a system which contains fine particles.

The following methods have been proposed: a method of forming mono-dispersed metal nanometer-sized particles continuously; a method of growing crystals by use of the above nanometer-sized particles as nuclei; and a method of performing demineralization or removal of decomposition products continuously from a colloidal dispersion of nanometer-sized particles. However, the size of the metal nanometer-sized particles is described as 10 nm or less, and particles larger than this size are not described (see, for example, JP-A No. 2003-193119).

Further, a new method of using a micro-mixer to produce morphologically uniform micrometer-sized particles and nanometer-sized particles continuously, and the use of this method for encapsulating active substances, and particles produced by this method has been suggested. However, the size of the produced micrometer-sized particles is from about 1 to about 1000 μm (about 10 μm in the working examples). In cases where a dispersion containing particles having a smaller specific gravity than that of the liquid medium thereof is delivered in a microflow-channel, floatation or the like occurs within the channel, resulting in hindrance to fluid flow or clogging of the channel (see, for example, Published Japanese Translation of PCT International Publication for Patent Application No. 2003-500202).

In short, no method for delivering a dispersion of fine particles in the order of microns stably and without clogging the dispersion-delivering channel has been suggested. For example, a method of synthesizing fine particles and delivering a dispersion containing the synthesized fine particles in a microflow channel, is carried out. However, the size of the fine particles is limited to a size in the order of nanomicrons. In methods for producing particles or the like in the order of microns by use of a microreactor, the particles are discharged from the system immediately after the particles are produced. Thus, no method wherein a liquid containing the particles is delivered in a microflow-channel has been suggested.

As described above, a method for delivering a dispersion of fine particles in the order of microns stably without the problems of floatation or clogging, or a device therefor has not been suggested.

SUMMARY OF THE INVENTION

The present invention has been made from the viewpoint in the above, and is to provide a method for delivering a fine particle dispersion, and a liquid delivering device for a fine particle dispersion.

A first aspect of the invention is to provide a method of delivering a fine particle dispersion, in which the fine particles are dispersed in a liquid medium, in a state of laminar flow from an inlet port to an outlet port of a microflow channel having the inlet port and the outlet port, wherein the microflow channel is disposed such that the outlet port is disposed above the inlet port in the buoyant force direction, the angle of the flow channel from the inlet port to the outlet port is set to from about 0 to 45° relative to the buoyant force direction, the fine particle dispersion is introduced into the inlet port and the introduced fine particle dispersion is delivered to the outlet port, and the fine particles have a volume average particle size of from about 1.5 µm to about 1000 µm and the specific gravity of the fine particles is from about 0.10 to about 0.99 times that of the liquid medium.

A second aspect of the present invention is to provide a method of delivering a fine particle dispersion, in which fine particles are dispersed in a liquid medium, in a state of laminar flow from an inlet port to an outlet port of a microflow channel which has the inlet port and the outlet port and which has a portion where the cross-sectional area of the flow channel changes and/or where the channel shape changes, wherein the microflow channel is disposed such that the outlet port is disposed above the inlet port in the buoyant force direction, the angle of the wall surfaces of the flow channel from the inlet port to the outlet port is set to from about 0 to about 45° relative to the buoyant force direction, the fine particle dispersion is introduced into the inlet port and the introduced fine particle dispersion is delivered to the outlet port, and the fine particles have a volume average particle size of from about 1.5 µm to about 1000 µm and the specific gravity of the fine particles is from about 0.10 to about 0.99 times that of the liquid medium.

A third aspect of the present invention is to provide a device for delivering a fine particle dispersion, in which fine particles are dispersed in a liquid medium, in a state of laminar flow from an inlet port to an outlet port of a microflow channel having the inlet port and the outlet port, wherein the microflow channel is disposed such that the outlet port is disposed above the inlet port in the buoyant force direction, the angle of the flow channel from the inlet port to the outlet port is set to from about 0 to about 45° relative to the buoyant force direction, wherein, the fine particles have a volume average particle size of from about 1.5 µm to about 1000 µm and the specific gravity of the fine particles is from about 0.10 to about 0.99 times that of the liquid medium.

A fourth aspect of the present invention is to provide a device for delivering a fine particle dispersion, in which fine particles are dispersed in a liquid medium, in a state of laminar flow from an inlet port to an outlet port of a microflow channel which has the inlet port and the outlet port and which has a portion where the diameter of the flow channel changes and/or where the channel shape changes, wherein, the microflow channel is disposed such that the outlet port is disposed above the inlet port in the buoyant force direction, the angle of the wall surfaces of the flow channel from the inlet port to the outlet port is set to from about 0 to about 45° relative to the buoyant force direction, and the fine particles have a volume average particle size of from about 1.5 µm to about 1000 µm and the specific gravity of the fine particles is from about 0.10 to about 0.99 times that of the liquid medium.

DETAILED DESCRIPTION OF THE INVENTION

Figure 1:
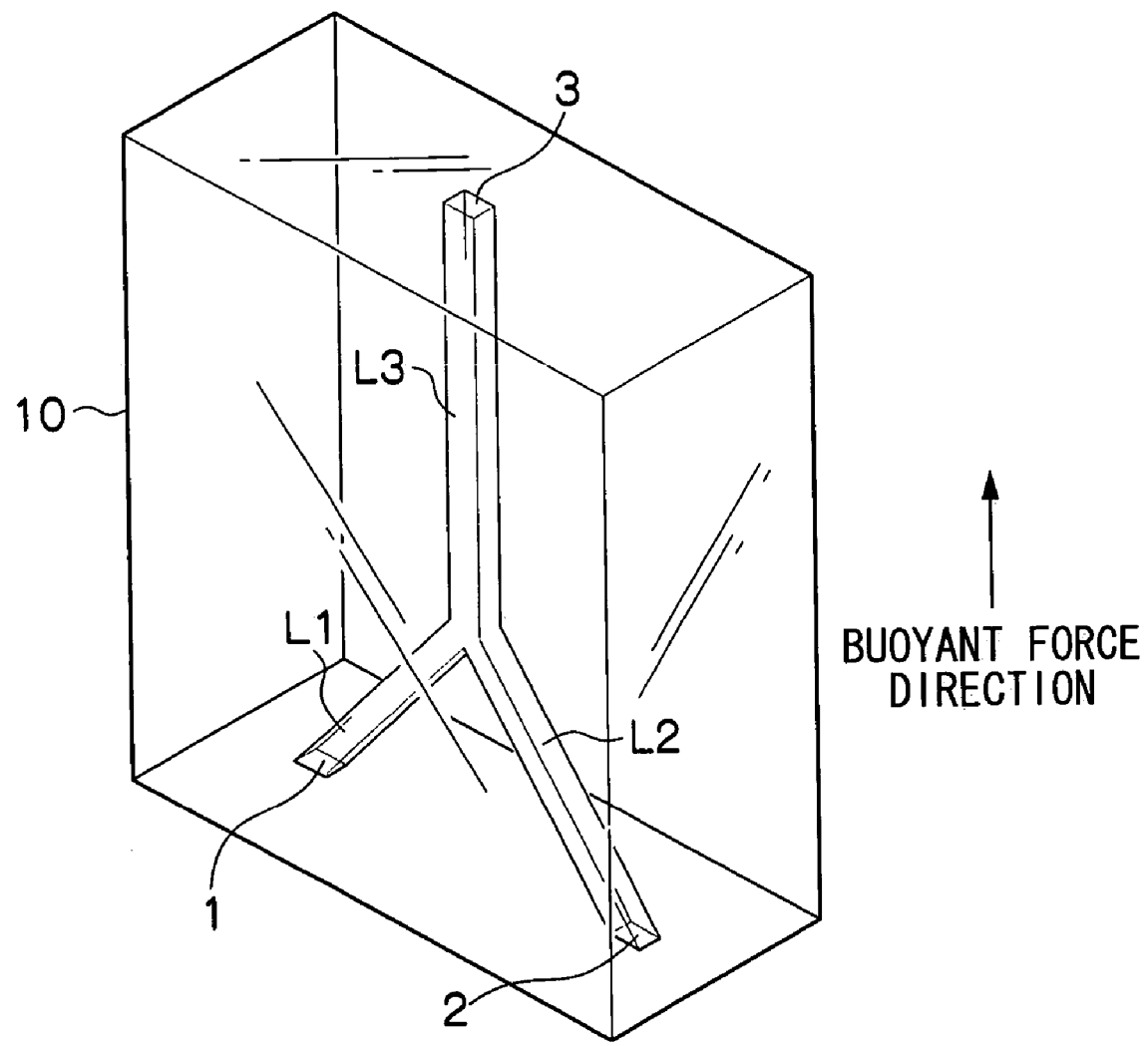
FIG. 1 is a schematic view that describes a microreactor used in Example 1.

Hereinafter, the present invention will be set forth in detail.

A first method of delivering a fine particle dispersion of the present invention (hereinafter referred to as "a first method of delivering liquid" of the present invention) is a method of delivering a fine particle dispersion in the state of laminar flow from an inlet port to an outlet port of a microflow channel having the inlet port and the outlet port, the fine particle dispersion containing fine particles having a volume average particle size of from approximately 1.5 µm to 1000 µm dispersed in a liquid medium, the specific gravity of the fine particles being from approximately 0.10 to 0.99 times that of the liquid medium, wherein the microflow channel is disposed such that the outlet port is disposed above the inlet port in the buoyant force direction, and the angle of the flow channel from the inlet port to the outlet port is set to from approximately 0 to 45° relative to the buoyant force direction, and wherein the fine particle dispersion is introduced into the inlet port and the introduced fine particle dispersion is delivered to the outlet port.

A second method of delivering a fine particle dispersion of the present invention (hereinafter referred to as "a second method of delivering liquid" of the present invention) is a method of a delivering fine particle dispersion in the state of laminar flow from an inlet port to an outlet port of a microflow channel having the inlet port and the outlet port, and having a portion where the cross-sectional area of the flow channel is changed and/or where the channel shape is changed, the fine particle dispersion containing fine particles having a volume average particle size of from approximately 1.5 µm to 1000 µm dispersed in a liquid medium, the specific gravity of the fine particles being from approximately 0.10 to 0.99 times that of the liquid medium, wherein the microflow channel is disposed such that the outlet port is disposed above the inlet port in the buoyant force direction, and the angle of the flow channel from the inlet port to the outlet port is set to from approximately 0 to 45° relative to the buoyant force direction, and wherein the fine particle dispersion is introduced into the inlet port and the introduced fine particle dispersion is delivered to the outlet port.

Here, a buoyant force direction means a direction to which the fine particles float when fine particles having a specific gravity smaller than that of a liquid medium are dispersed in the liquid medium.

In the present invention, the volume average particle size of the above fine particles is a value determined by use of Coulter Counter TA-II Model (manufactured by Coulter, Inc.), except for the case of the particle size (5 µm or less) described below. In this case, the particle size is determined by using an appropriate aperture size according to particle size levels of fine particles. Since fine particles in the range of from 2% to 50% of an aperture diameter are to be measured, an aperture diameter is selected in such a way that particle diameters are within the range.

When the particle sizes are 5 µm or less, however, the sizes are determined by means of a laser diffraction scattering type particle size distribution measuring apparatus (Trade Name: LA-700, manufactured by Horiba, Ltd.).

The specific gravity of the aforementioned fine particles is determined by the vapor phase substitution process (pycnometer method) by use of Ultrapycnometer 1000 (Trade Name), manufactured by Yuasa-Ionics Co., Ltd.

The specific gravity of the liquid medium is determined by means of a specific gravity measuring kit AD-1653 of A & D Corp.

A fine particle dispersion used in the first and second methods of delivering a liquid according to the present invention (hereinafter, may be generally referred to as "method of delivering a liquid of the invention") contains fine particles having a volume average particle size of from about 1.5 µm to about 1000 µm dispersed in the liquid medium; and the specific gravity of the fine particles is from about 0.10 to about 0.99 times that of the liquid medium, and preferably about 0.40 to about 0.99.

The aforementioned fine particles are not particularly limited as long as the volume average particle size is from about 1.5 µm to about 1000 µm.

It is necessary that the volume average particle size of the above fine particles is from about 1.5 µm to about 1000 µm, as mentioned above. It is preferable that the volume average particle size of the above fine particles is from about 1.5 µm to about 500 µm, more preferably from about 1.5 µm to about 200 µm, most preferably from about 1.5 µm to about 50 µm. If the volume average particle size of the above fine particles exceeds about 1000 µm, the fine particles in the fine particle dispersion delivered through a microflow channel may clog the channel since the cross-sectional area of a microflow channel used in the present invention is from several micrometers to thousands of micrometers, as will be described hereinafter. On the other hand, if the volume average particle size of the fine particles is less than about 1.5 µm, the problem that the fine particles deposit on the inner wall surface of the microflow channel rarely occurs, but the interaction between the fine particles and the inner wall surface becomes large, resulting in problems of adhesion and the like of the fine particles to the inner wall surface.

The shape of the fine particles is not particularly limited. However, if the fine particles are of a needle form, and in particular if the long axis thereof becomes larger than ¼ of the width of the channel, the possibility of clogging of the channel becomes higher. From the above viewpoint, the ratio of the long axis length of the fine particles to the short axis length thereof (that is, the long axis length/the short axis length) is preferably from about 1 to about 50, and more preferably from about 1 to about 20. It is desirable to select the flow channel width appropriately in accordance with the particle size and the particle shape.

The kinds of the fine particles that may be used include, not limited thereto, for example, materials such as resin fine particles, inorganic fine particles, metal fine particles and ceramic fine particles as described below. Examples of the fine particles include fine particles having an absolute specific gravity smaller than that of the medium solvents, regardless of the presence of voids within the particles. More specifically, the examples include fine particles of rubbers, waxes, and hollow particles. The fine particles of the aforementioned rubbers that may be used include materials such as nitrile rubber, styrene rubber and isobutylene rubber, which are made to be fine particles. Formation of fine particles can be conducted by emulsion polymerization, or by a mechanical way such as a freezing and cooling pulverization.

The wax fine particles can be formed by making resins to be fine particles by means of any one of conventionally known processes using an emulsifying and dispersing apparatus and the like, described in "The Society of Polymer Science, Japan", March, 1995, Hannohkohgaku Kenkyukai (Chemical Reaction Engineering Research Conference) Report 1, "Nyuka/Bunsan To Kohbunshibiryushi No Ryushikei Seigyo (Emulsion/Dispersion Technology and Control of the Particle Size of Polymer Fine Particles) Chapter 3."

The wax fine particles may be wax fine particles (mold releasing agent) prepared by adding a mold releasing agent to an appropriate solvent which is compatible with the mold releasing agent when heated and which does not dissolve the mold releasing agent at room temperature, heating and dissolving the mold releasing agent, thereafter gradually cooling the solution to room temperature, and subsequently precipitating the fine particles of the mold releasing agent (dissolution deposition method), or by heating and evaporating a mold releasing agent in an inert gas such as helium to form particles in the gas phase, adhering and recovering the particles to a cooled film or the like, followed by dispersing the particles in a solvent (gas-phase evaporation process).

The above-described the wax fine particle preparation method may combine with a mechanical pulverizing method that uses a medium and the like to form finer particles.

Examples of resins for raw materials of the wax fine particles include a low molecular weight polypropylene and a low molecular weight polyethylene as well as plant waxes as waxes such as carnauba wax, cotton waxes, haze wax and rice wax, animal waxes such as beeswax and lanolin, mineral waxes such as ozokerite and ceresine, petroleum waxes such as paraffin, microcrystalline wax and petrolatum. The examples also include synthetic hydrocarbon waxes such as Fischer-Tropsch wax and polyethylene wax, in addition to the natural waxes. Of these, preferable resins for raw materials of the wax fine particles that may be used include a low molecular weight polypropylene and a low molecular weight polyethylene as well as carnauba wax and paraffin.

Inorganic and organic hollow particles may be used as the hollow particles. Preferable examples of inorganic hollow particles include silica-based, and silica/alumina-based particles. As organic hollow particles, resin-based particles are preferred. The number of voids within a particle may be one or plural. The void ratio is not particularly limited, but preferably from about 20% to about 80%, more preferably from about 30% to about 70%. Specific examples of inorganic hollow particles include Fillite (Trade Name), manufactured by Nippon Ferrite Co., Ltd., and Cenorrite (Trade Name), manufactured by Tomoe Engineering Co., Ltd. Examples of organic fine particles include Expancel (Trade Name), manufactured by Nippon Ferrite Co., Ltd., ADVAN CELL (Trade Name), manufactured by Sekisui Chemical Co., Ltd., SX866 (A) and SX866 (B) (Trade Names), manufactured by JSR Corp., and Nipol MH5055 (Trade Name), manufactured by Nippon Zeon Corp. Of the above hollow particles, Expancel, manufactured by Nippon Ferrite Co., Ltd., is preferably used. Thermal expansive fine particles such as Expancel DU are particularly used after expanding the particles to a desired size by suitably heating the particles.

A variety of methods are used for producing these fine particles. Particles can be prepared by synthesis in a liquid medium and directly treating the fine particles, or particles can be prepared by mechanically pulverizing bulk material and dispersing the resulting fine particles in a liquid medium. In this case, the material is usually pulverized in a liquid medium and is directly treated as such.

In cases where powder (fine particles) is produced in a dry process, it is necessary to disperse previously the powder in a medium. The method for dispersing the dry powder in the medium may be a method using a sand mill, a colloid mill, an attritor, a ball mill, a Dyno mill, a high-pressure homogenizer, an ultrasonic disperser, a co-ball mill, a roll mill or the like. At this time, it is preferable to perform the method under conditions where the primary particles are not pulverized by the dispersion process.

It is necessary that the specific gravity of the fine particles is from about 0.10 to about 0.99 times that of the liquid medium, preferably from about 0.40 to about 0.99 times, more preferably from about 0.70 to about 0.95 times. If the specific gravity of the fine particles is less than about 0.10 times that of the liquid medium, the floatation of the fine particles occurs vigorously, thereby making the conveyance of the fine particles difficult. On the other hand, if the specific gravity of the fine particles is higher than about 0.99 times that of the liquid medium, the fine particles are sedimented.

The liquid medium is not particularly limited, as long as the specific gravity of the fine particles is set to from about 0.10 to about 0.99 times that of the liquid medium as described above. Examples of the liquid mediums include water, aqueous media, and organic solvent-based media.

Examples of the water include ion exchanged water, distilled water, and electrolytic ion water. Specific examples of the organic solvent-based media include methanol, ethanol, n-propanol, n-butanol, benzyl alcohol, methyl cellosolve, ethyl cellosolve, acetone, methylethylketone, cyclohexanone, methyl acetate, n-butyl acetate, dioxane, tetrahydrofuran, methylene chloride, chloroform, chlorobenzene, toluene, xylene and the like, and mixtures of two or more species thereof.

Preferable medium solvents may vary with kinds of the fine particles. A dispersant such as a surfactant may be added thereto in order to obtain a good dispersibility of the fine particles in the liquid medium.

In a liquid delivering method of the present invention, preferable combinations of fine particles and medium solvents include combinations of polyolefin fine particles or hollow fine particles and ion exchanged water. Of these, preferable combinations include a combination of paraffin wax fine particles, carnauba wax fine particles or thermally expanded fine particles of Expancel and ion exchanged water.

The content of the fine particles in the fine particle dispersion is preferably from about 0.1 to 60% by volume, more preferably from about 5 to about 30% by volume. If the content of the fine particles in the fine particle dispersion is less than about 0.1% by volume, recovery of the fine particles may become problematic. If the content is about 60% by volume or higher, the possibility that the particles clog the flow channel becomes higher.

The microflow-channel used in the present invention includes an inlet port and an outlet port, and a flow channel having a width in the order of micrometers, specifically a channel having a width from several micrometers to several thousands of micrometers. A microreactor is preferably used as the microflow-channel.

A method of delivering a liquid of the present invention, and a device for delivering a fine particle dispersion in a microflow channel of the present invention will be described hereinafter in case that a microreactor is used as the microflow channel.

The microreactor used in the present invention is a reactor having flow passages (channels) in a micrometer scale, and the number of the channels is preferably two or more. Since each of the channels of the microreactor is in a micrometer scale, both the dimensions and the flow rate thereof are small, and the Reynolds number thereof is several hundreds or less. Accordingly, when a liquid is delivered in the microreactor used in the present invention, the liquid is delivered in laminar flow state.

The Reynolds number (Re) is represented by the equation: $Re=uL/v$, wherein u represents the flow rate, L represents the characteristic length, and v represents the kinematic viscosity coefficient. When this value is about 2300 or less, the laminar flow is predominant.

The material of the microreactor used in the present invention may be a material such as metal, ceramic, plastic or glass or the like which are commonly used. It is preferable that the material is appropriately selected depending on the liquid medium to be delivered.

In the first method of delivering a fine particle dispersion of the present invention, the outlet port is disposed above the inlet port in the buoyant force direction, and the angle of the flow channel from the inlet port to the outlet port is set to from approximately 0 to 45° relative to the buoyant force direction in the microreactor. The angle of the flow channel relative to the buoyant force direction means the angle of a line formed by connecting the centers of gravity in each flow channel when each of the flow channels is cut at two portions relative to the buoyant force direction. The angle of flow channel relative to the buoyant force direction is preferably about 0 to about 30°, more preferably about 0 to about 15°, still more preferably about 0 to about 10°, and particularly preferably about 0 to about 5°. If the angle of the flow channel relative to the buoyant force direction is larger than about 45°, the fine particles adhere to and deposit on the upper wall surface within the flow channel due to floatation of the particles, resulting in clogging of the flow channel.

In the second method of delivering a fine particle dispersion of the present invention, the microreactor which has the outlet port disposed above the inlet port in the buoyant force direction, and which has a portion where the cross-sectional area of the flow channel is changed and/or where the channel shape is changed, and the angle of the flow channel from the inlet port to the outlet port is set to from approximately 0 to 45° relative to the buoyant force direction. The angle of flow channel relative to the buoyant force direction is preferably about 0 to about 30°, more preferably about 0 to about 15°, still more preferably about 0 to about 10°, and particularly preferably about 0 to about 5°. If the angle of the flow channel relative to the buoyant force direction is larger than about 45°, the fine particles adhere to and deposit on the upper wall surface within the flow channel due to floatation of the particles, resulting in clogging of the flow channel.

In the second method of delivering a liquid of the present invention, the cross-sectional size of the flow channel at an outlet port side may be larger than that of the inlet port side (the flow channel expands) as long as the angle of the wall face relative to the buoyancy direction is from 0 to 45°. However, if the cross-sectional size of the flow channel at the outlet port side is larger than that of at the inlet port, the flow rate in a border region where the size of the flow channel changes becomes largely slower, which sometimes causes deposit of the fine particles or clogging of the fine particles due to stagnant flow of the liquid. Preferably, the cross-sectional size of the flow channel at the outlet port side is thus smaller than that of the inlet port side.

In the second method of delivering a fine particle dispersion of the present invention, when a microreactor has a portion where the cross-sectional size of the channel is changed and/or where the channel shape is changed, the angle of the wall surface of the portion where the cross-sectional size of the channel is changed and/or where the channel shape is changed relative to the buoyant force direction is preferably from about 0 to about 45°, more preferably from about 0 to about 30°, still more preferably from about 0 to about 15°, particularly preferably from about 0 to about 10°, and most preferably from about 0 to about 5°.

In order to prevent of deposition of fine particles within a microflow channel, such problem will simply be solved by making of the direction of the flow channel the same as the direction of the buoyant force. However, it is impossible that all flow channels within the microreactor are made to the buoyant force direction. As a result of detailed studies on the relationship between the inclination of the flow channel and the degree of floatation of fine particles, it has been found that the angle of the channel or the wall surface of the flow channel relative to the buoyant force direction is set to from about 0 to about 45° so that there is substantially no problems regarding the floatation of fine particles. By doing this, when the fine particle dispersion is introduced into the inlet port, the fine particles float by the buoyant force in a stable state without deposit of the fine particles on the inner upper surface of the flow channel, and without clogging or blockage, so that the fine particle dispersion can be conveyed to the outlet port and recovered with a high recovery efficiency.

The method of delivering a liquid of the present invention is preferably used in cleaning of fine particles. Generally, a method combining a batch type filtration and re-dispersion for cleaning of fine particles is used, resulting in a low recovery efficiency due to transfer of substances between processes, and residue of fine particles on a filter paper. The method of delivering a liquid of the present invention provides a highly efficient method which solves the problem of the floatation of fine particles.

A first device for delivering a fine particle dispersion of the present invention (hereinafter referred to as "a first device for delivering a liquid" of the present invention) is a device for delivering a fine particle dispersion in the state of laminar flow from an inlet port to an outlet port of a microflow channel having the inlet port and the outlet port, the fine particle dispersion containing fine particles having a volume average particle size of from approximately 1.5 µm to 1000 µm dispersed in a liquid medium, the specific gravity of the fine particles being from approximately 0.10 to 0.99 times that of the liquid medium, wherein the microflow channel is disposed such that the outlet port is disposed above the inlet port in the buoyant force direction, and the angle of the flow channel from the inlet port to the outlet port is set to from approximately 0 to 45° relative to the buoyant force direction, and wherein the fine particle dispersion is introduced into the inlet port and the introduced fine particle dispersion is delivered to the outlet port.

A second device for delivering a fine particle dispersion of the present invention (hereinafter referred to as "a second device for delivering a liquid" of the present invention) is a device for a delivering fine particle dispersion in the state of laminar flow from an inlet port to an outlet port of a microflow channel having the inlet port and the outlet port, and having a portion where the cross sectional size of the flow channel is changed and/or where the channel shape is changed, the fine particle dispersion containing fine particles having a volume average particle size of from approximately 1.5 µm to 1000 µm dispersed in a liquid medium, the specific gravity of the fine particles being from approximately 0.10 to 0.99 times that of the liquid medium, wherein the microflow channel is disposed such that the outlet port is disposed above the inlet port in the buoyant force direction, and the angle of the flow channel from the inlet port to the outlet port is set to from approximately 0 to 45° relative to the buoyant force direction, and wherein the fine particle dispersion is introduced into the inlet port and the introduced fine particle dispersion is delivered to the outlet port.

The terms of the fine particle dispersion and microflow channel in the first and second liquid delivering devices (hereinafter may generally be referred to as "a liquid delivering device of the present invention") are the same as those in the first and second liquid delivering methods.

The terms of the angle of the flow channel relative to the buoyant force direction, the angle of the wall surface of the flow channel relative to the buoyant force in the liquid delivering device of the present invention are the same as those of the first and second liquid delivering methods of the present invention, and the preferred ranges of these values in the first and second liquid delivering devices are the same as those of the first and second liquid delivering methods of the present invention.

By the use of the liquid delivering device, when the fine particle dispersion is introduced into the inlet port, the fine particles float by the buoyant force in a stable state without deposit of the fine particles on the inner upper surface of the flow channel, and without clogging or blockage of the channel, so that the fine particle dispersion can be delivered to the outlet port and recovered with a high recovery efficiency.

The liquid delivery device of the present invention is preferably used in cleaning of fine particles. Generally, a method combining a batch type filtration and re-dispersion for cleaning of fine particles is used, resulting in a low recovery efficiency due to transfer of substances and residual fine particles on a filter paper. The device for delivering a liquid of the present invention provides a highly efficient device which solves the problem of the floatation of fine particles. Further, the liquid delivery device of the present invention can be operated over a long period of time.

EXAMPLES

Hereinafter, the present invention will be described in detail with reference to Examples; however, the invention is by no means limited to the Examples.

First, the measuring methods of various characteristics in the Examples and Comparative Examples below will be described.

The volume average particle size of the above fine particles is a value determined by use of Coulter Counter TA-II Model (manufactured by Coulter, Inc.), except for the case of the particle size (5 µm or less) described below. In this case, the particle size is determined by using an appropriate aperture size according to particle size levels of fine particles. When the particle size is 5 µm or less, however, the size is determined by means of a laser diffraction scattering type particle size distribution measuring apparatus (Trade Name, LA-700, manufactured by Horiba, Ltd.).

The specific gravity of the fine particles is determined by the vapor phase substitution process (pycnometer method) by use of Ultrapycnometer 1000 (Trade Name), manufactured by Yuasa-Ionics Co., Ltd. The specific gravity of the above liquid medium is determined by means of a specific gravity measuring kit AD-1653 of A & D Corp.

Example 1

Example 1 will be described with reference to FIG. 1. FIG. 1 is a schematic view that describes a microreactor used in Example 1. In FIG. 1, a microreactor 10 is made of glass and is provided with channels L1, L2, and L3. The flow channels L1, L2, and L3 have, respectively, inlet ports 1, 2, and 3; the crosssection of each channel is rectangular and the depth of the channel is 150 µm. The channels L1 and L2 are 200 µm in width and 30 mm in length. On the other hand, L3 is 400 µm in width and 70 mm in length. The angle of each of the channels L1 and L2 relative to the buoyant force direction is 45°; and the angle of the channel L3 relative to the buoyant force direction is 0°.

Dispersion A which is describe below is introduced into an inlet port 1 and ion exchanged water is introduced into an inlet port 2 by use of an introducing device (not shown) and they were pressurized.

Dispersion A is an aqueous dispersion containing 10% by volume of polyolefin fine particles (manufactured by Nippon Seiro Co., Ltd.) having a volume average particle size of approximately 5 µm (paraffin wax having a melting point of 85° C. is made to fine particles by the use of a Goulin mixer). The specific gravity of polyolefin fine particles is 0.90 times that of water.

Dispersion A and the ion exchanged water introduced into the inlet ports 1 and 2, respectively, are pressurized and delivered toward an outlet port 3, entered into the flow channel L3, and then are discharged and recovered from the outlet port 3. The flow rates of dispersion A and the ion exchanged water are the same and 0.05 ml/hr. Further, the dispersion A and the ion exchanged water are introduced into the inlet ports 1 and 2 over 5 hours, respectively, and are delivered over 5 hours. The polyolefin fine particles are stably delivered without adhesion to the wall surface of the channel, clogging, or the like.

Comparative Example 1

Dispersion A is introduced into the inlet port 1 and ion exchanged water into the inlet port 2 and then pressurized as in Example 1 by means of a microreactor having the same configuration as the microreactor used in Example 1 with the exception that the angles of the channels L1 and L2 relative to the buoyant force direction are 50°. In approximately 60 minutes, slight deposits of olefin fine particles are recognized on the upper surface of the inner wall of the flow channel L1 in the buoyant force direction, and in approximately 120 minutes, deposits are observed in the flow channel L1.

Example 2

Figure 2:
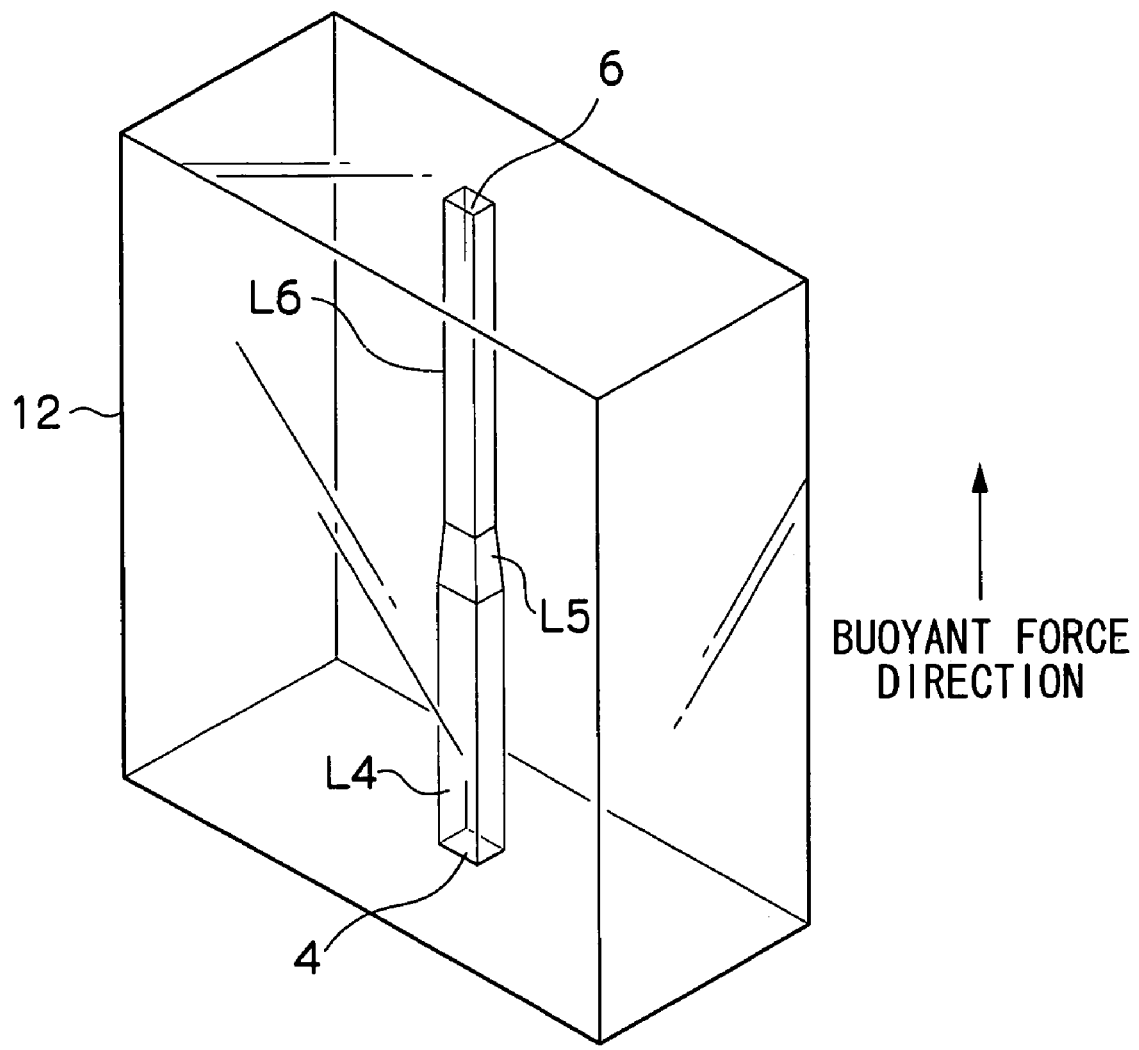
FIG. 2 is a schematic view that describes a microreactor used in Example 2.

Example 2 will be described with reference to FIG. 2. FIG. 2 is a schematic view that describes a microreactor used in Example 2. In FIG. 2, a microreactor 12 is made from acrylic resin and is provided with flow channels L4, L6 and a connecting flow channel L5. Each of the channels L4, L6, and the connecting channel L5 has a rectangular crosssection and the depth thereof is 100 µm. The flow channel L4 has 500 µm in width and 30 mm in length, the flow channel L6 has 200 µm in width and 30 mm in length; the connecting channel L5 is a channel connecting the channels L4 and L6 and the angle of the wall surface relative to the buoyant force direction is 30°. The channels L4 and L6 have, respectively, an inlet port 4 and an outlet port 6.

Dispersion B, which is described below, is introduced into the inlet port 4 by means of an introducing device (not shown) and pressurized.

Dispersion B is an aqueous dispersion containing 10% by volume of hollow resin fine particles (Trade Name, Expancel UD, manufactured by Nippon Ferrite Co., Ltd.) having a volume average particle size of approximately 35 µm. The specific gravity of the hollow resin fine particles is 0.11 times that of water.

Dispersion B introduced in the inlet port 4 is delivered toward the outlet port 6 by pressurization, and the flow rate of the dispersion B is 5.7 ml/hr. Further, dispersion B is introduced into the inlet port 4, and is transported over 5 hours; and the hollow resin fine particles are stably delivered without adhesion to the wall surface, clogging, or the like.

Comparative Example 2

Dispersion B is introduced into the inlet port 4 and then pressurized as in Example 2 by means of a microreactor having the same structure as the microreactor used in Example 2 with the exception that the angle of the connecting channel L5 relative to the buoyant force direction is 90°. In approximately 30 minutes, deposits of the hollow olefin fine particles are observed on the upper surface of the inner wall of the connecting channel L5.

Comparative Example 3

Dispersion E is introduced into the inlet port 4 and then pressurized as in Example 2 by means of a microreactor having the same structure as the microreactor used in Example 2 with the exception that the angle of the connecting channel L5 relative to the buoyancy direction is 50°. After approximately 2 hours, deposits of hollow resin fine particles is observed on the wall surface, and in approximately 3 hours, a tendency to further deposition of the fine particles is observed. It is confirmed that the liquid conveyance over a long period of time is problematic.

According to the liquid delivering method of the present invention, a fine particle dispersion can be delivered in a microflow channel in a stable flow state without forming deposits on the inner upper wall surface of the flow channel, clogging or blockage of the microflow channel. Further, according to the liquid delivering device of the present invention, a fine particle dispersion can be delivered in a microflow channel in a stable flow state without forming deposits on the inner upper wall surface of the flow channel, clogging or blockage, and a microflow channel which can be used for a long period of time.

What is claimed is:

1. A method of delivering a fine particle dispersion, to minimize stagnation, depositon or clogging in which the fine particles are dispersed in a liquid medium, in a state of laminar flow from an inlet port to an outlet port of a microflow channel having the inlet port and the outlet port, the method comprising;

arranging the microflow channel such that an outlet port is disposed above an inlet port in a buoyant force direction, setting an angle of the microflow channel extending from the inlet port to the outlet port within a range of 0° to 45° relative to the buoyant force direction, and introducing the fine particle dispersion into the inlet and delivering, by the liquid medium the fine particle dispersion to the outlet port, wherein fine particles of the particle dispersion have a volume average particle size within range of 1.5 µm to 1000 µm, and a specific gravity of the fine particles is within a range of 0.10 to 0.99 times that of the liquid medium such that stagnation, deposition or clogging is minimized.

2. The method of claim 1, wherein the fine particles are at least one of fine particles selected from a group consisting of resin particles, inorganic particles, metal particles and ceramic particles.

3. The method of claim 1, wherein the volume average particle size is within a range of 1.5 μm to 500 μm.

4. The method of claim 1, wherein a ratio of a long axis length of the fine particles to a short axis length of the fine particles is within a range of 1:1 to 50:1.

5. The method of claim 1, wherein the specific gravity of the fine particles is within a the range of 0.40 to 0.99 times that of the liquid medium.

6. The method of claim 1, wherein the content of the fine particles in the fine particle dispersion is within a range of 0.1% to 60% by volume.

7. The method of claim 1, wherein an angle of the microflow channel extending from the inlet port to the outlet port is set within a range of 0° to 30° relative to the buoyant force direction.

8. The method of claim 1, an angle of the microflow channel extending from the inlet port to the outlet port is set within a range of 0° to 15° relative to the buoyant force direction.

9. A method of delivering a fine particle dispersion, to minimize stagnation, depositon or clogging in which fine particles are dispersed in a liquid medium, in a state of laminar flow from an inlet port to an outlet port of a microflow channel which has the inlet port and the outlet port and which has a portion where a cross-sectional area of the microflow channel changes, the method comprising:
arranging the microflow channel which has a portion where a cross-sectional area of the microflow channel changes such that an outlet port is disposed above an inlet port in a buoyant force direction,
setting an angle of wall surfaces of the microflow channel extending from the inlet port to the outlet port within a range of 0° to 45° relative to the buoyant force direction,
introducing the fine particle dispersion into the inlet port and delivering, by the liquid medium the introduced fine particle dispersion to the outlet port, and
wherein fine particles of the fine particle dispersion have a volume average particle size within a range of 1.5 μm to 1000 μm and a specific gravity of the fine particles is within a range of 0.10 to 0.99 times that of the liquid medium such that stagnation, depositon or clogging is minimized.

10. The method of claim 9, wherein the fine particles are at least one of fine particles selected from a group consisting of resin particles, inorganic particles, metal particles and ceramic particles.

11. The method of claim 9, wherein, the specific gravity of the fine particles is within a range of 0.40 to 0.99 times that of the liquid medium.

12. The method of claim 9, wherein an angle of the wall surfaces of the microflow channel extending from the inlet port to the outlet port at a portion where the cross-sectional area of the microflow channel changes is set within a range of 0° to 30° relative to the buoyant force direction.

13. The method of claim 9, wherein the angle of the wall surfaces of the microflow channel extending from the inlet port to the outlet port at a portion where the cross-sectional area of the microflow channel changes is set within a range of 0° to 15° relative to the buoyant force direction.

14. The method of claim 9, wherein the volume average particle size is within a range of 1.5 μm to 500 μm.

15. A device for delivering a fine particle dispersion, which minimize stagnation, depositon or clogging in which fine particles are dispersed in a liquid medium, in a state of laminar flow from an inlet port to an outlet port of a microflow channel having the inlet port and the outlet port, comprising:
a microflow channel disposed such that an outlet port is disposed above an inlet port in a buoyant force direction, and an angle of the microflow channel from the inlet port to the outlet port is set within a range of 0° to 45° relative to the buoyant force direction,
wherein fine particles in a fine particle dispersion within a range of have a volume average particle size of from 1.5 μm to 1000 μm and a specific gravity of the fine particles is within a range of 0.10 to 0.99 times that of the liquid medium, and the fine particle dispersion is delivered from the inlet port to the outlet port by the liquid medium flowing a laminar flow state such that stagnation, depositon or clogging is minimized.

16. The device according to claim 15, wherein an angle of the microflow channel is set within a range of 0° to 30° relative to the buoyant force direction.

17. The device for according to claim 15, wherein an angle of the microflow channel is set within a range of 0° to 15° relative to the buoyant force direction.

18. A device for delivering a fine particle dispersion, which minimize stagnation, depositon or clogging in which fine particles are dispersed in a liquid medium, in a state of laminar flow from an inlet port to an outlet port of a microflow channel which has the inlet port and the outlet port and which has a portion where the diameter of the microflow channel changes, comprising:
a microflow channel which has a portion where a diameter of the microflow channel changes disposed such that an outlet port is disposed above an inlet port in a buoyant force direction, and an angle of wall surfaces of the microflow channel extending from the inlet port to the outlet port is set within a range of 0° to 45° relative to the buoyant force direction,
wherein fine particles of a fine particle dispersion have a volume average particle size within a range of 1.5 μm to 1000 μm and a specific gravity of the fine particles is within a range of 0.10 to 0.99 times that of the liquid medium, and the fine particle dispersion is delivered from the inlet port to the outlet port by the liquid medium flowing in laminar flow state such that stagnation, depositon or clogging is minimized.

19. The device according to claim 18, wherein an angle of wall surfaces of the microflow channel extending from the inlet port to the outlet port at a portion where the diameter of the microflow channel changes is set within a range of 0° to 30° relative to the buoyant force direction.

20. The device for delivering a fine particle dispersion according to claim 18, wherein an angle of wall surfaces of the microflow channel extending from the inlet port to the outlet port at a portion where the diameter of the flow channel changes is set within the range of 0° to 15° relative to the buoyant force direction.

* * * * *